Aug. 9, 1932.  J. McDONOUGH ET AL  1,871,408
WORKHOLDING FIXTURE
Filed Dec. 17, 1928   2 Sheets-Sheet 1
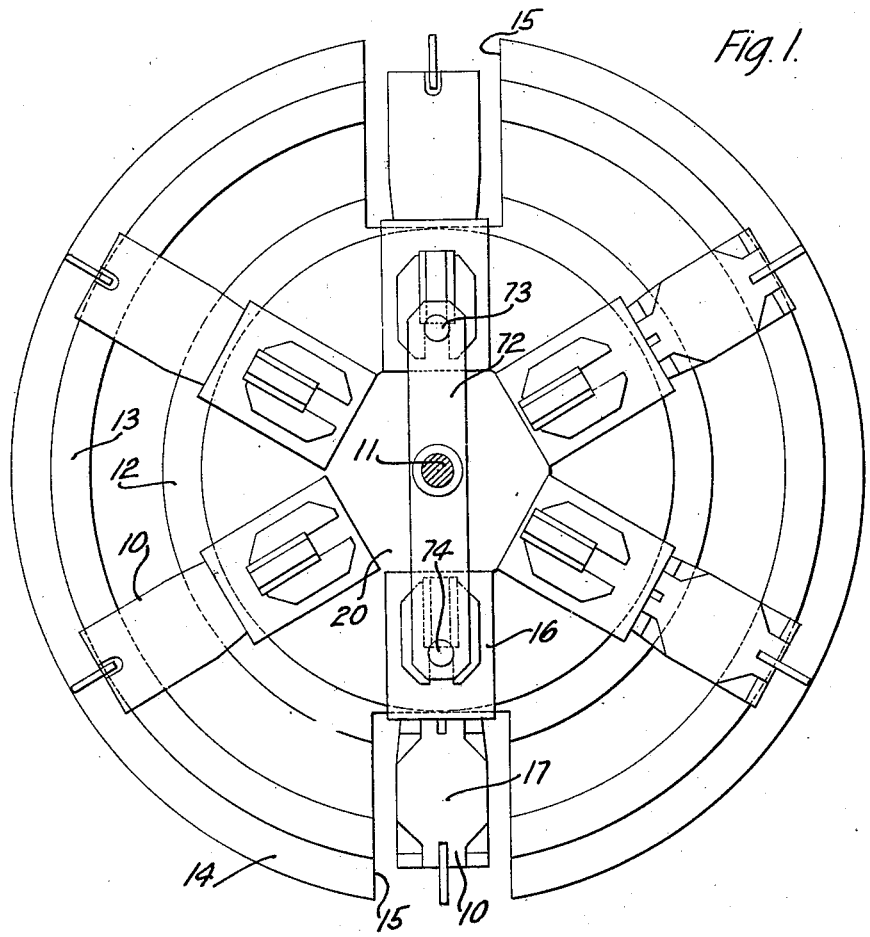
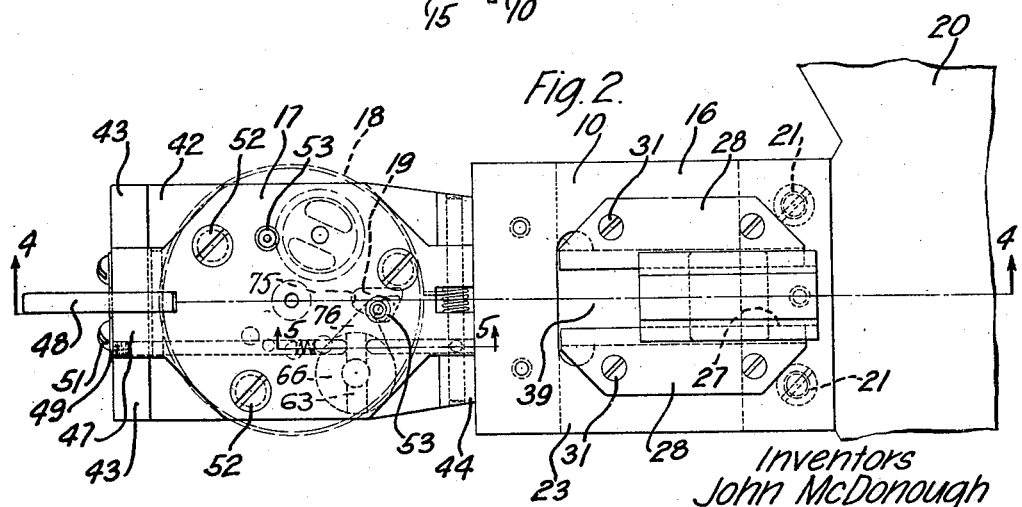
Inventors
John McDonough
Darrell D. Rock
By  H. A. Patterin  Att'y.

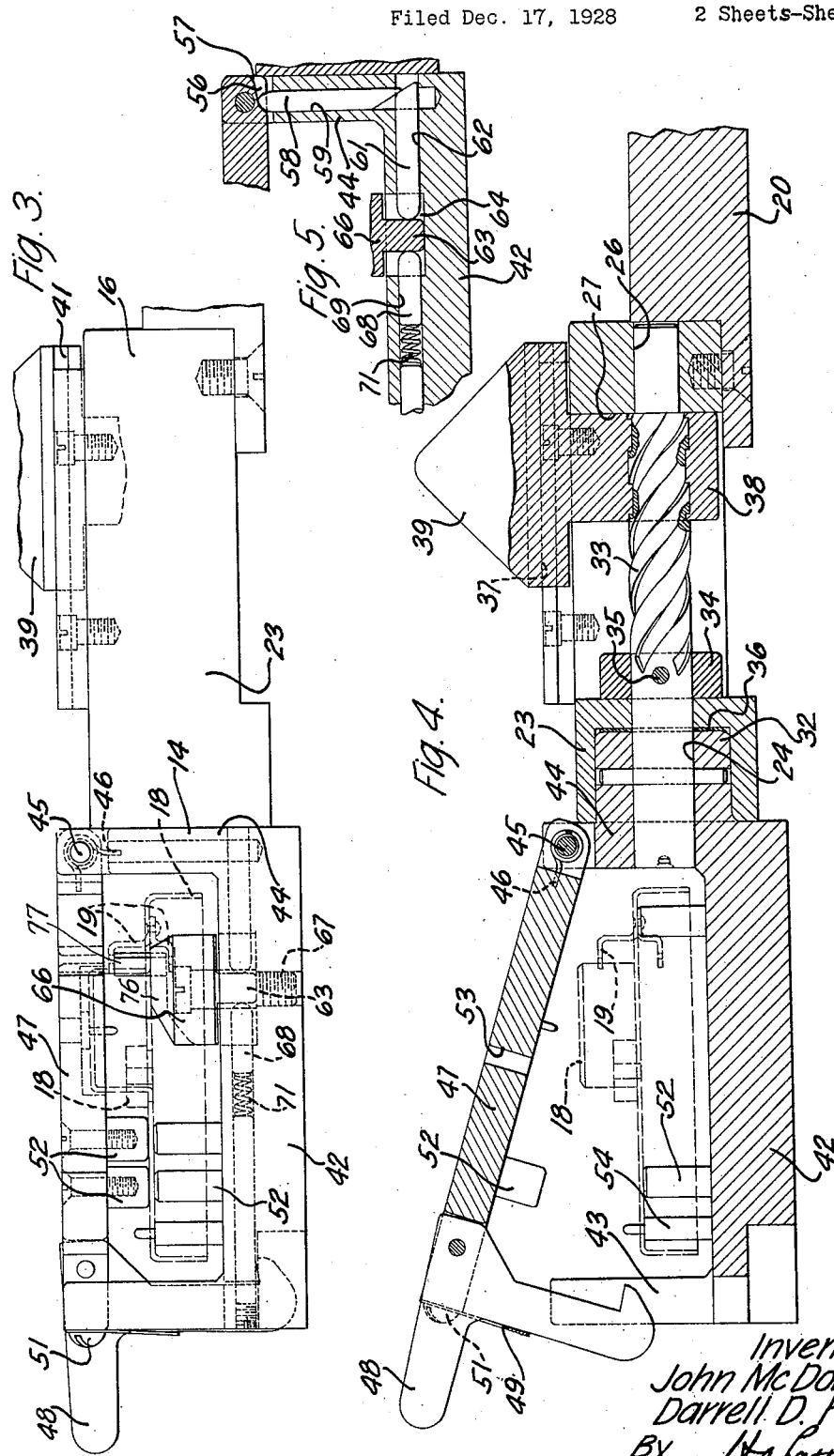

Patented Aug. 9, 1932

1,871,408

UNITED STATES PATENT OFFICE

JOHN McDONOUGH, OF CHICAGO, AND DARRELL DWAIN ROCK, OF CICERO, ILLINOIS, ASSIGNORS TO WESTERN ELECTRIC COMPANY, INCORPORATED, OF NEW YORK, N. Y., A CORPORATION OF NEW YORK

WORKHOLDING FIXTURE

Application filed December 17, 1928. Serial No. 326,471.

This invention relates to work holding fixtures, and more particularly to work holding fixtures for use with drill presses and the like.

It has been the practice in some instances, in forming, drilling, die pressing and otherwise machining parts, to mount the parts in jigs which are radially disposed on a circular dial or tray, by which means the parts are successively indexed to positions in the machining process. However, since it has often been desired to machine the parts with the same battery of drills on more than one surface, it has been necessary to interrupt the machining process in order to present a new surface of the part to the tool.

Objects of the present invention are to provide means for supporting a part to be machined, varying the position of the part while being so supported to permit the subjection of one of a number of surfaces thereof to the working tool, and for expeditiously disengaging the supporting means from the part.

In accordance with one embodiment of the invention, a jig is furnished in which the part is clamped and which has attached thereto a spirally grooved member engaging a block having a wedge-shaped cam upper portion. This cam is so positioned as to be engaged by a depending post attached to the tool supporting head when it descends. In a certain position of the indexing wheel the cam member moves radially of the wheel to cause the rotation of the spirally grooved member to turn the fixture and the part held thereby through an arc of 180°. An auxiliary pivoted support is provided for supporting an offset portion of the part, the support being rotated into operating position by the closing of the jig, and is disengaged by the opening of the jig at the end of the machining operation.

A more complete understanding of the invention may be secured from the following specification considered in connection with the accompanying drawings, in which Fig. 1 shows a diagrammatic plan view of a drill press table equipped with six work holding fixtures embodying the features of the invention;

Fig. 2 is an enlarged fragmentary plan view of a work holding fixture;

Fig. 3 is an enlarged fragmentary side elevation of a work holding fixture, showing the leaf thereof in closed position;

Fig. 4 is a section taken on the line 4—4 of Fig. 2, showing the leaf in open position, and Fig. 5 is a fragmentary section taken on the line 5—5 of Fig. 2, showing the leaf in closed position.

One embodiment of the invention contemplates the provision, in a drill press or similar machine, of a work holding fixture 10, which is mounted on a vertical shaft 11 of a drill press of any usual type (not shown) in such manner that it will rotate with the shaft and be carried over tracks 12 and 13, which are superimposed upon the usual table 14, having oppositely disposed recesses 15—15. The fixture comprises a housing 16 and a jig 17 for holding a part 18 (shown in dotted lines) having offset bracket portions 19. The housing is secured to a hub 20 by screws 21—21 and comprises a casing 23 having a circular aperture 24 (Fig. 4) at one end and a second circular aperture 26 at the other end. The upper portion of the casing is provided with a slot 27 (Fig. 2) having guides 28—28 secured thereon laterally of the slot by a plurality of screws 31.

A jig of the conventional latch leaf type for holding the part to be treated is provided externally of the hinged end thereof with a wrist-bearing lug 32 to which is rigidly secured and from which projects at right angles with that end of the jig, a spiral shaft 33. Rigidly mounted on the shaft is a thrust collar 34 held in place by a pin 35 in such manner that it will turn with the shaft 33. A thrust washer 36 is mounted on the spiral shaft between the wrist-bearing lug 32 and the thrust collar 34. A cam nut 37, comprising a spirally grooved nut portion 38 and a triangular cam portion 39, the cam portion having lateral grooves 41—41, is mounted on the spiral shaft 33 in such manner that a downward pressure slidingly contacting on the surface of the cam portion will cause a traverse of the slot 27 by the cam nut, the guides fitting into the grooves of the cam nut to provide a rigid channel for its travel. The jig 17 comprises a base 42, spaced jaws 43—43 at one end projecting at right angles to the base, and an apron portion 44 extending at right angles to the base at the other end.

Hingeably mounted in the apron portion 44 by a pin 45 and a spring 46 is a leaf member 47 provided with a latch 48, which is yieldably held in closed position by a spring 49 secured to the edge of the leaf member by screws 51—51. Projecting from the inward surfaces of the base and leaf members of the jig are a plurality of clamping posts 52 for cooperatively bracing the part 18 during the working steps. Similarly provided in the leaf and base members are a plurality of apertures 53, and formed posts 54 for protecting the part during treatment. The leaf member of the jig is provided at its hinged end with a recess 56 and a shoulder 57 against which bears a rounded end of a cam pin 58, which travels vertically in a groove 59 bored through the apron 44. The opposite end of the pin is beveled to correspond with a cooperating cam pin 61 which travels laterally of the jig in a groove 62 bored through the base of the jig. The rounded head of the cam pin 61 bears against a pivoted arm 63 seated in a recess 64 of the base 42, the pinion forming the base of a revolvable bracket comprising a circular portion 66, a laterally extending arm 76 and a supporting member 77, which is adapted to fit between the brackets 19. The bracket support is secured to the pinion by a screw 67. A pin 68 travels in a groove 69 of the base 42 and is yieldably held in contact against the pinion by a compression spring 71. A horizontal bar 72 slidably mounted on the shaft 11 and rigidly secured in any suitable manner to a cluster drill head (not shown) of the drill press is provided at its ends with downwardly extending cam posts 73 and 74 so positioned as to be maintained directly above the recesses 15—15 of the table 14.

A clearer understanding of the invention may be secured by considering as an example the use, on a table of a drill press designed to treat work which is to be indexed through six positions, of six work holding fixtures of the type described. When the jig is in its initial position and normally upright, a blank part is placed therein, and the leaf member of the jig is closed and latched. By any suitable means (not shown) conventional with a drill press, the loaded jig is moved by the shaft 11 in a counter-clockwise direction to the second position where it is subjected to treatment by a suitable tool embraced in a conventional cluster drill head (not shown), the type of tool being determined by the treatment desired to be impressed upon the part. The working tool engages the part through apertures 53 in the jig, which are placed to accord with the location of the work to be performed on the part. The portion of the part being treated is usually supported from the opposite side of the jig. Upon completion of the treatment at the second position, the part is indexed to a third position where it is appropriately treated and subsequently rotated to a fourth position, over the recess 15. While the work holding fixture is in its normal upright position to permit one surface of the part to be treated, the cam nut 39 is in that portion of its travel which brings it nearest the shaft 11 and such is the position which it occupies during the initial and two subsequent positions, and is its position when it is indexed to the fourth position. Upon reaching the fourth position, however, a downward movement of the cluster drill head, actuated by any suitable means (not shown), which downward movement corresponds to the movement which brings the tools into engagement with the work in the second and third positions, causes the cam post 73 to engage the surface of the cam nut 39 and thrust it forwardly in the slot 27 between the guides 28—28 away from the central shaft 11. The spiral shaft 33 revolves as the cam nut 39 is thrust forwardly by the cam post and rotates the jig through an angle of 180°.

The work holding fixture, having been thus reversed in position, is moved by the subsequent action of the indexing mechanism to a fifth position. In the fifth and a sixth position, the jig remains in its reversed or upside down position and thus subjects another side of the part to treatment by the tools. Subsequent to the treatment received while in the sixth position, the fixture is returned to the initial position over the apertures 15 of the drill table and there is returned to its normal upright position by action of the cam post 74 upon the surface of the cam nut 39 to cause travel thereof in the slot 27 radially in the direction of the shaft 11. Upon the jig attaining its upright position, the latch 48 and leaf member 47 may be lifted, the finished part removed and a blank part inserted for treatment.

It is obvious that the number of work holding fixtures employed, and the number of positions to which a fixture may be indexed may be varied, for instance, in accordance with the size of the drill press, or the circumference of the hub 20. The jig containing the part may be made revolvable through any desired portion of 360° by a corresponding positioning of the cam nut 39 on the spiral shaft 33. The points at which the work holding fixture may be turned may be altered to meet the requirements of a particular job by the employment of additional means for actuating the cam nut at those positions where it may be desired that a revolution or partial revolution of the jig be accomplished.

During the positioning of the part 18 in the jig the auxiliary pivoted support is so positioned that the supporting member 77 extends through an opening 75 in the part, produced by the forming of upper bracket portion 19 thereof (Figs. 3 and 4). The movement of the auxiliary support into and out of supporting relation with the offset bracket portions 19 is accomplished automatically during the closing and opening of the leaf member 47. Upon closing the leaf member 47 after the part 18 has been placed in position in the jig, the spring 71, previously compressed during the opening of the leaf member, is rendered effective as the shoulder 57 of the leaf member is moved to the position shown in Fig. 5 which permits the cam pin 58 to move upwardly, to move the pin 68 towards the right (Fig. 5) and thereby cause a clockwise rotation of the pivoted arm 63. This oscillates arm 76 of the support to move supporting member 77 into supporting position between the offset bracket portions 19 of the part 18 to insure that the portions 19 will not be bent or otherwise forced out of position when these portions are being subjected to treatment. When the leaf member 47 is raised to permit the removal of the worked part 18, the cam pin 58 is forced downwardly by the shoulder 57 of the leaf member and the beveled portion thereof bearing against the beveled portion of the pin 61 moves the latter toward the left (Fig. 5) and causes a counterclockwise rotation of the pivoted arm 63, against which it bears, and thereby oscillates the bracket support attached thereto from out of supporting position between the bracket portions 19 of the part 18 and into alignment with the opening 75 of the part, thus permitting free withdrawal of the part from the jig. At the same time the spring 71 is compressed again to provide the actuating force for rotating the pivoted arm 63 and the bracket support carried thereby when the leaf member is again lowered. The tension of the spring 46 surrounding the pin 45 assists in the raising of the leaf member 47, as just described, upon release of the latch 48. The clamping posts 52 on the inner surfaces of the base and leaf members clamp the part between them, holding it rigid, and the formed posts 54 provide means for supporting the immediate areas of the part being treated and assisted in preventing bending or other distortion of the part.

By employing the apparatus above described or any other of the numerous embodiments of which the invention is capable, it will be found that the part being machined will be rigidly embraced in the jib, that while being so embraced it may be indexed through the successive steps in the machining process, and may be treated on more than a single surface without necessitating withdrawal from the jig, or any repositioning of the part therein.

It should be understood that the invention is not to be limited to the particular embodiment of the invention which has been described, but is only to be limited by the scope of the appended claims.

What is claimed is:

1. In a drill press having a reciprocating tool supporting head, a work indexing hub, a work holding fixture comprising a housing secured to the indexing hub, a spiral shaft journaled at both ends in the housing, a cam member having an upper camming surface and threaded to the spiral shaft and movable therealong between the two journalled ends for rotating the shaft, cam means secured to the reciprocating tool supporting head for engaging said upper camming surface of the cam member upon reciprocation of the tool supporting head to move the cam member along the shaft, a base member for receiving the work pinned to one end of the spiral shaft, a leaf member pivoted to the base for clamping the work thereto, a pivoted support mounted in the base for securing a portion of the work, and cam means operable upon opening and closing the leaf member for actuating the pivoted support out of and into engagement with the work, respectively.

2. In a drill press having a reciprocating tool supporting member, a work indexing hub, a work holding fixture comprising a housing secured to the indexing hub, a spiral shaft journalled at both ends within the housing, a cam member threaded to the shaft and movable therealong between its journalled ends for actuating the shaft and having an upper triangular camming portion, a pair of cam posts mounted on diametrically opposite sides of the reciprocating tool supporting head for engaging and moving said triangular cam member alternately back and forth along the spiral shaft, a base member for receiving the work secured to one end of the spiral shaft, a leaf member pivoted to the base member for clamping the work therein, a pivoted support mounted in the base member for engaging a portion of the work, and cam means operable upon opening and closing of the leaf member for rotating the pivoted support out of and into engagement with the work, respectively.

3. A fixture for holding a part to be worked upon having an offset portion over an imperforate portion, comprising a base member for supporting the part, an element movable on the base for clamping the part thereto, an auxiliary support on the base member having a supporting member movable into and out of operative position for supporting the offset portion of the part, and means rendered effective by the movement of the element into its clamping position for moving the auxiliary support into its operative position.

4. A fixture for holding a part to be worked upon having offset portions, comprising a base member for supporting the part, a clamping element movable on the base for clamping the part thereto, an auxiliary support pivoted on the base, an arm spaced from the base and carried by said support, and movable into and out of operative position between the offset portions of the part for supporting said portions, means rendered effective by the movement of the clamping element into its clamping position for moving the arm into its operative position, and means actuated by the movement of the clamping element out of its clamping position for moving the arm out of its operative position.

In witness whereof, we hereunto subscribe our names this 3rd day of December, A. D. 1928.

JOHN McDONOUGH.
DARRELL DWAIN ROCK.